United States Patent
Armando et al.

(10) Patent No.: US 8,316,669 B2
(45) Date of Patent: *Nov. 27, 2012

(54) GLASSWARE FORMING MACHINE MOLDS OPENING/CLOSING DEVICE

(75) Inventors: Lorenzo Armando, Cuneo (IT);
Gianclaudio Borsarelli, Cuneo (IT);
Carlo Sesia, Cuneo (IT)

(73) Assignee: Bottero S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,106

(22) Filed: Sep. 2, 2011

(65) Prior Publication Data

US 2011/0314872 A1    Dec. 29, 2011

Related U.S. Application Data

(63) Continuation of application No. 12/027,758, filed on Feb. 7, 2008, now Pat. No. 8,082,758.

(30) Foreign Application Priority Data

Feb. 7, 2007    (IT) .................................. 2007A0090

(51) Int. Cl.
*C03B 9/00* (2006.01)
*C03B 9/197* (2006.01)

(52) U.S. Cl. ................ 65/240; 65/227; 65/359; 65/360; 65/231

(58) Field of Classification Search ............ 65/227–251, 65/357–360
See application file for complete search history.

(56) References Cited

U.S. PATENT DOCUMENTS

| | | | |
|---|---|---|---|
| 1,843,159 A * | 2/1932 | Ingle | 65/75 |
| 4,443,241 A * | 4/1984 | Jones | 65/29.1 |
| 4,462,519 A | 7/1984 | Parkell et al. | |
| 4,466,532 A | 8/1984 | Minneman et al. | |
| 4,499,920 A * | 2/1985 | Steffan et al. | 137/624.15 |
| 4,502,721 A | 3/1985 | Savin-Czeizler et al. | |
| 4,596,591 A | 6/1986 | Nebelung et al. | |
| 4,655,813 A * | 4/1987 | Nebelung | 65/359 |

(Continued)

FOREIGN PATENT DOCUMENTS

DE    29922204    3/2000

(Continued)

OTHER PUBLICATIONS

Background of the Invention for the above-captioned application filed Sep. 2, 2011 (previously provided).

(Continued)

*Primary Examiner* — Matthew Daniels
*Assistant Examiner* — Jodi C Franklin
(74) *Attorney, Agent, or Firm* — Sheridan Ross PC

(57) ABSTRACT

A mold of a glassware forming machine has a longitudinal plane of symmetry, and two half-molds movable between a closed position and an open extraction position by a powered mold opening/closing device, which has a fixed fastening and supporting structure, two mold-holders, and, for each mold-holder, a respective supporting and actuating arm hinged to the relative mold-holder to rotate about a movable hinge axis, and to the fixed structure to rotate about a fixed hinge axis; the fixed hinge axes being located on opposite sides of the plane of symmetry, and at such a distance from the plane of symmetry that, when the half-molds are in the closed position, the line intersecting the fixed axis and movable axis of each arm extends substantially parallel to the plane of symmetry.

19 Claims, 6 Drawing Sheets

U.S. PATENT DOCUMENTS

| | | | |
|---|---|---|---|
| 4,927,444 A | | 5/1990 | Voisine |
| 5,275,638 A * | | 1/1994 | Sidler ............................... 65/359 |
| 5,324,340 A | | 6/1994 | Withrow et al. |
| 5,429,651 A | | 7/1995 | Bolin |
| 5,649,991 A * | | 7/1997 | Jones ............................... 65/229 |
| 5,733,354 A | | 3/1998 | Voisine et al. |
| 5,741,343 A | | 4/1998 | Lloyd et al. |
| 5,755,847 A | | 5/1998 | Quayle |
| 5,803,945 A * | | 9/1998 | Grant ............................... 65/359 |
| 5,824,131 A * | | 10/1998 | Grant et al. ..................... 65/359 |
| 5,833,731 A * | | 11/1998 | Mungovan et al. ............. 65/227 |
| 5,833,732 A * | | 11/1998 | Roberts ........................... 65/227 |
| 5,858,050 A * | | 1/1999 | Slocum et al. .................. 65/225 |
| 5,876,476 A * | | 3/1999 | Borbone et al. ................ 65/241 |
| 5,887,450 A * | | 3/1999 | Slocum et al. .................. 65/359 |
| 5,902,370 A * | | 5/1999 | Lovell et al. .................... 65/359 |
| 5,938,809 A * | | 8/1999 | Mungovan et al. ............. 65/240 |
| 5,958,101 A * | | 9/1999 | Pinkerton et al. ............... 65/240 |
| 5,974,835 A * | | 11/1999 | Lovell et al. .................... 65/229 |
| 5,988,355 A | | 11/1999 | Merour |
| 5,992,612 A | | 11/1999 | Sidler et al. |
| 6,151,918 A * | | 11/2000 | DiFrank et al. ................ 65/172 |
| 6,494,063 B1 * | | 12/2002 | Malek ............................. 65/260 |
| 6,601,410 B1 | | 8/2003 | Bogert et al. |
| 6,702,097 B1 | | 3/2004 | Leidy et al. |
| 7,047,766 B2 * | | 5/2006 | Schneider et al. .............. 65/236 |
| 7,185,515 B2 * | | 3/2007 | Shue et al. ...................... 65/236 |
| 7,278,529 B2 | | 10/2007 | Borsarelli et al. |
| 7,320,230 B2 | | 1/2008 | Lockhart |
| 7,325,668 B2 | | 2/2008 | Borsarelli et al. |
| 7,681,711 B2 | | 3/2010 | Borsarelli et al. |
| 7,854,312 B2 | | 12/2010 | Borsarelli et al. |
| 7,997,101 B2 | | 8/2011 | Armando et al. |
| 2003/0015002 A1 * | | 1/2003 | Flynn .............................. 65/356 |
| 2003/0101758 A1 * | | 6/2003 | Schneider et al. .............. 65/232 |
| 2006/0179884 A1 * | | 8/2006 | DiFrank et al. ................. 65/85 |
| 2008/0282739 A1 * | | 11/2008 | Cramer ........................... 65/260 |
| 2009/0000337 A1 * | | 1/2009 | Cramer ........................... 65/227 |

FOREIGN PATENT DOCUMENTS

| | | |
|---|---|---|
| EP | 0195599 | 9/1986 |
| EP | 1213487 | 6/2002 |
| EP | 1278705 | 1/2003 |
| EP | 1772436 | 4/2007 |
| GB | 2292551 | 2/1996 |

OTHER PUBLICATIONS

Extended European Search Report for corresponding divisional European Patent Application No. 11162529.9, dated Jul. 5, 2011, 6 pages.

Official Action for U.S. Appl. No. 12/027,758, mailed Jun. 8, 2010.
Official Action for U.S. Appl. No. 12/027,758, mailed Nov. 12, 2010.
Official Action for U.S. Appl. No. 12/027,758, mailed Apr. 25, 2011.
Notice of Allowance for U.S. Appl. No. 12/027,758, mailed Aug. 12, 2011.

* cited by examiner

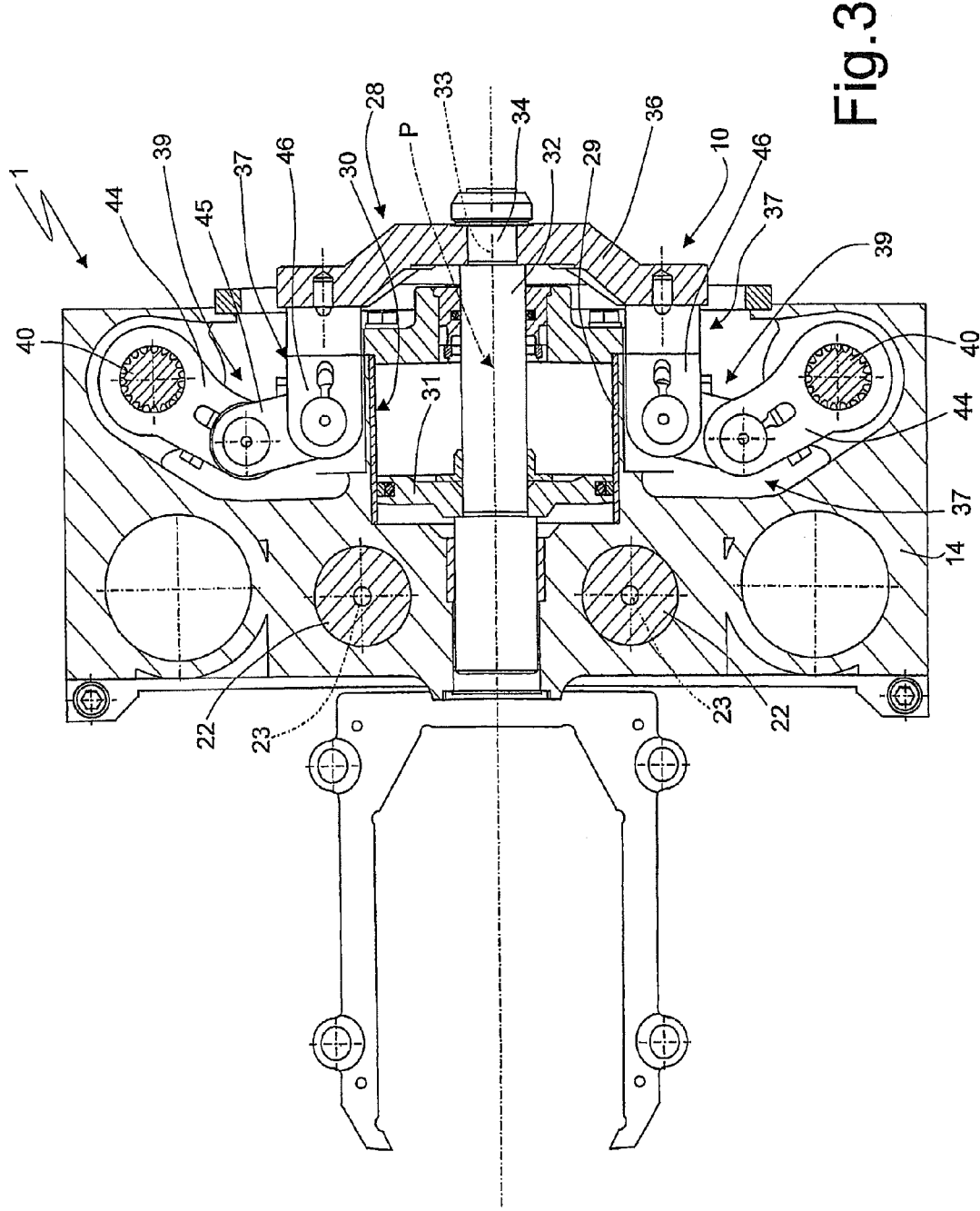

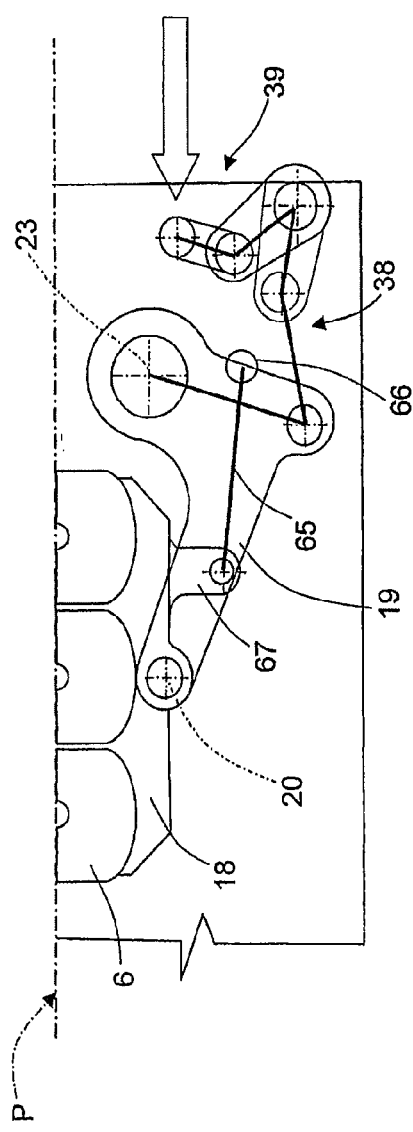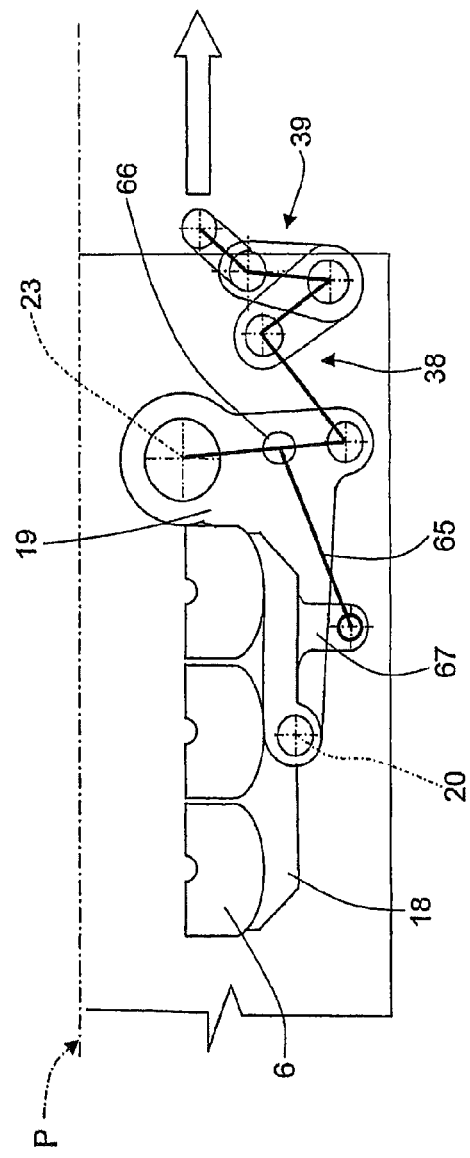

GLASSWARE FORMING MACHINE MOLDS OPENING/CLOSING DEVICE

The present application is a continuation of U.S. Patent application Ser. No. 12/027,758filed on Feb. 7, 2008, now U.S. Pat. No. 8,082,758 issued Dec. 27, 2011, entitled "GLASSWARE FORMING MACHINE MOLDS OPENING/CLOSING DEVICE" which claims the benefit of Italian Patent Serial No. TO 2007 A 000090 filed Feb. 7, 2007 entitled "GLASSWARE FORMING MACHINE MOLDS OPENING/CLOSING DEVICE" and claims foreign priority benefits under 35 U.S.C. § 119, the entire content of each is incorporated herein by reference in its entirety for all purposes.

The present invention relates to a glassware forming machine molds opening/closing device.

BACKGROUND OF THE INVENTION

In glassware forming, forming machines commonly known as I.S. forming machines are used, which comprise a number of side by side forming sections, each for producing a respective sequence of products. Each forming section comprises a rough mold, normally comprising a row of side by side cavities, each for receiving a glass gob and forming a respective semifinished article, which is then transferred to a finish mold by means of an inverter. Each rough mold comprises two half-molds movable with respect to each other between a closed position defining the row of cavities, and an open position in which to remove the semifinished articles.

The half-molds are moved between the open and closed positions by means of a mold opening/closing device comprising an actuating arm for each half-mold. The actuating arms are connected at one end to the respective half-molds, and are hinged at the other end to a fixed supporting structure to rotate, in opposite directions and with respect to the fixed structure, about a fixed common hinge axis aligned with and parallel to the row of cavities.

The arms are connected to transmissions activated by respective actuators, which, also for reasons of size, are located at a distance from the mold.

Though widely used, known solutions of the above type have several drawbacks. In particular, the location of the arm hinge axis poses problems when working with a large number of cavities, on account of the cavities not being opened simultaneously and in the same way, due to the different trajectories travelled by the various portions of the half-molds, depending on how far away they are from the hinge axis. And this is reflected in the semifinished articles, which, by the time the molds are open, have different surface qualities and, at times, even different structural characteristics, sometimes bordering on the critical.

Known opening/closing devices are also unsatisfactory in terms of efficiency, particularly when the machine is operated at a high output rate, and are invariably bulky, especially perpendicular to the longitudinal plane of symmetry of the mold. This is mainly due to the transmissions having extremely long torsion shafts for transferring motion from the remote actuator, and which inevitably twist, thus creating unacceptable delays in opening/closing the molds, and unpredictable wear which, once initiated, worsens rapidly and uncontrollably.

Besides being complex and bulky, the transmissions of known solutions are also located alongside or outwards of the arms, thus increasing the size of the mold opening/closing devices crosswise.

SUMMARY OF THE INVENTION

It is an object of the present invention to provide a molds opening/closing device designed to provide a straightforward, low-cost solution to the above problems, and which, at the same time, is efficient, reliable, and compact.

According to the present invention, there is provided a device for opening/closing a mold of a glassware forming machine, the mold having a longitudinal plane of symmetry, and comprising two movable half-molds; the device comprising a supporting structure, and, for each said half-mold, a respective mold-holder, and a respective supporting and actuating arm hinged to the relative mold-holder to rotate about a movable hinge axis, and to the supporting structure to rotate about a fixed hinge axis; the device also comprising actuating means for rotating the arms in opposite directions with respect to the supporting structure, and for moving the half-molds between a closed position and an open position; and being characterized in that said fixed hinge axes are located on opposite sides of said plane of symmetry, and at such a distance from the plane of symmetry that, when the half-molds are in the closed position, the line intersecting said fixed axis and said movable axis of each arm extends substantially parallel to said plane of symmetry.

In the device defined above, said half-molds preferably surround movable retaining means for retaining semifinished articles formed in said mold; said movable retaining means being maintained connected to said half-molds and in a plane perpendicular to said plane of symmetry and to said fixed and movable axes; and said actuating means comprise at least a linear actuator intersected by said plane.

The present invention also relates to a glassware forming machine.

According to the present invention, there is provided a glassware forming machine comprising a section frame; at least one mold having a longitudinal plane of symmetry, and comprising two movable half-molds; and an opening/closing device for moving the half-molds between a closed position and an open position; characterized in that said opening/closing device is as claimed in the attached Claims.

BRIEF DESCRIPTION OF THE DRAWINGS

A number of non-limiting embodiments of the invention will be described by way of example with reference to the accompanying drawings, in which:

FIG. 3 shows a section, with parts removed for clarity, along line III-III in FIG. 2;

FIGS. 4a and 4b show, schematically and with parts removed for clarity, a mold opening/closing device in accordance with the invention in two different operating positions;

DETAILED DESCRIPTION OF THE INVENTION

Figure 1:
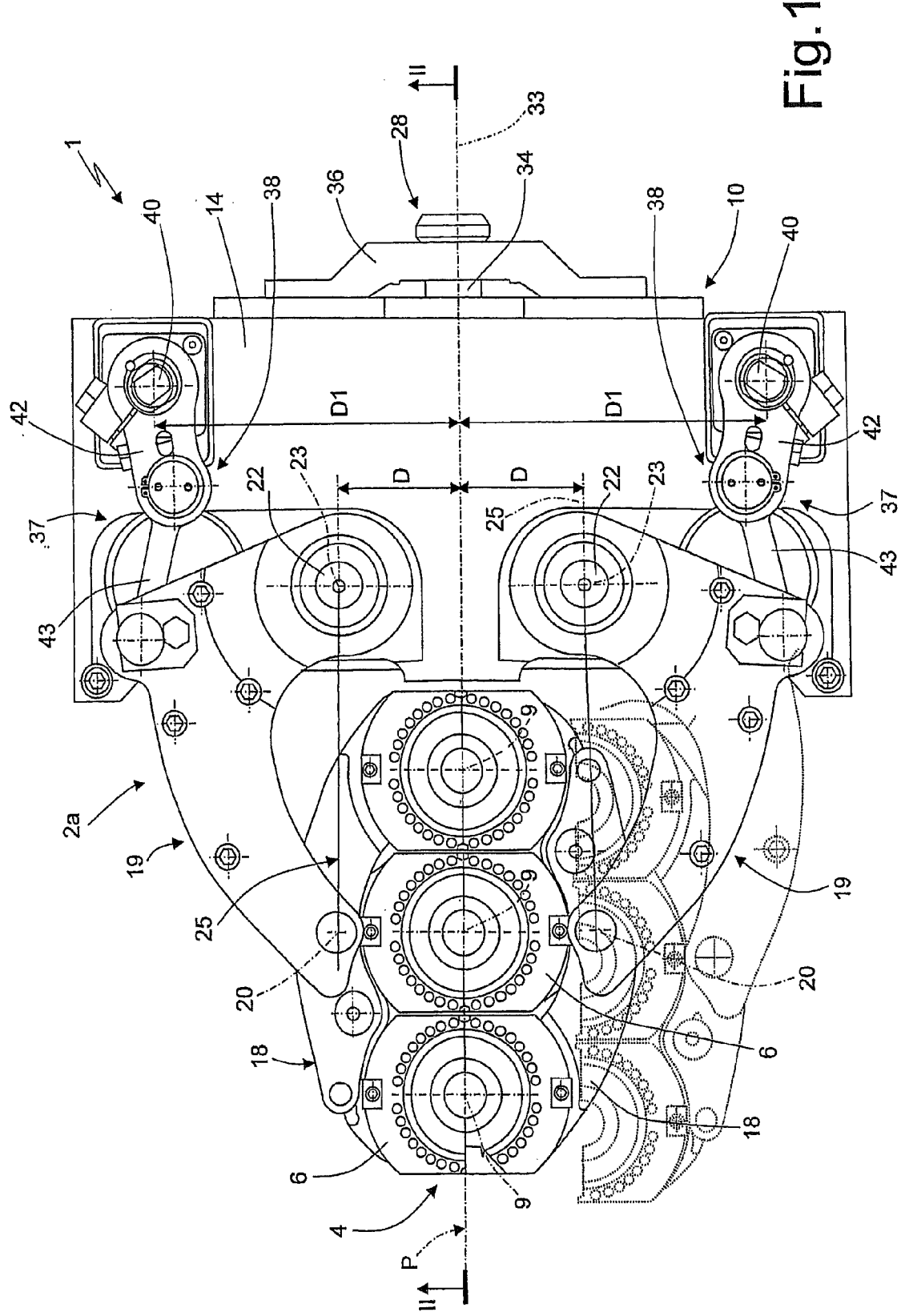
FIG. 1 shows a plan view, with parts removed for clarity, of a first preferred embodiment of the molds opening/closing device according to the present invention associated with an inverter, shown partly, of a glassware forming machine.
Figure 2:
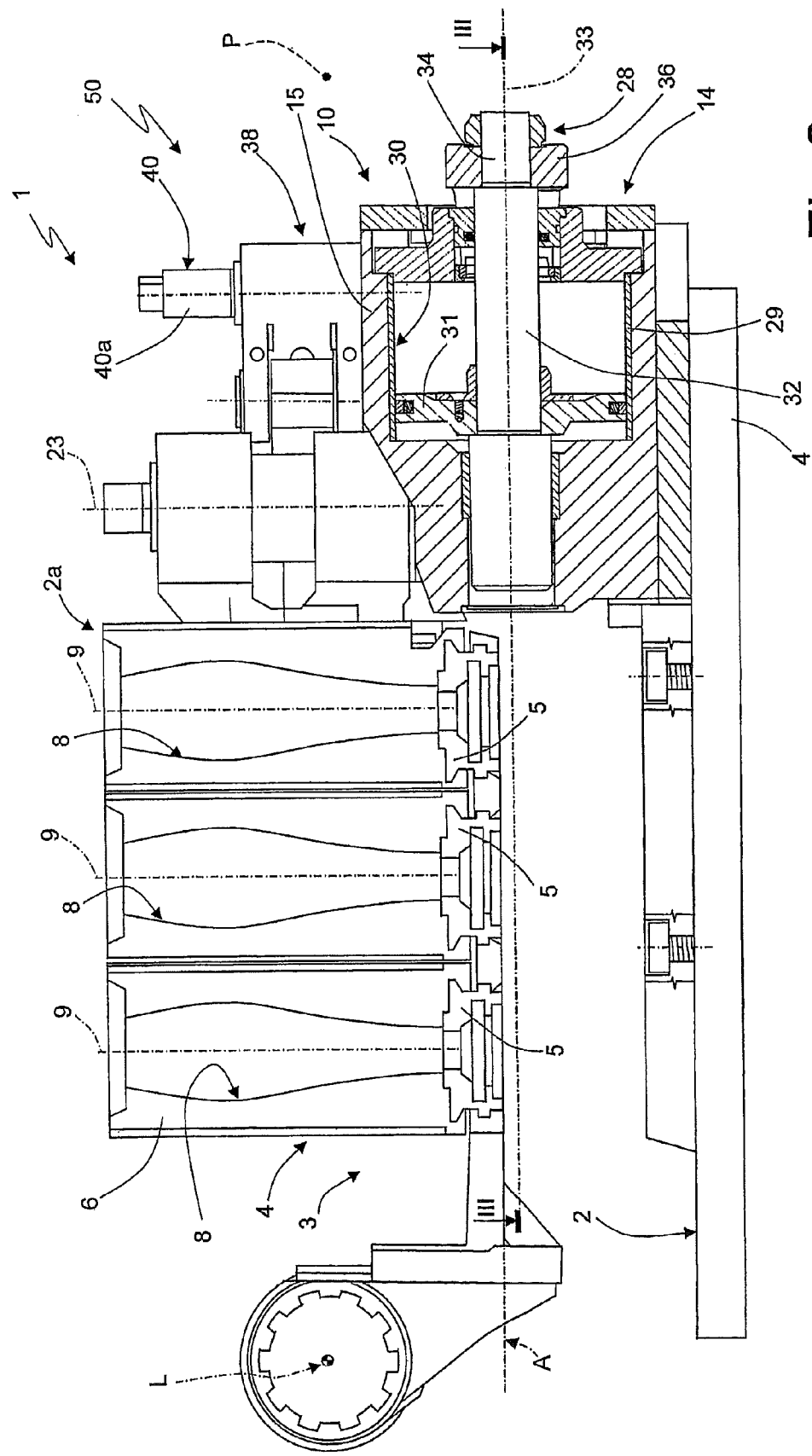
FIG. 2 shows a section along line II-II in FIG. 1.

Number 1 in FIGS. 1 and 2 indicates as a whole a machine for forming glassware items (not shown). Machine 1 comprises one or more side by side forming stations; and each forming station comprises a known supporting structure or section frame 2 (shown partly in FIG. 2), a rough mold assembly 2a fitted to section frame 2 and for forming a number of semifinished articles, and a known inverter 3, not described in detail, for transferring the semifinished articles from rough mold assembly 2a to a finish mold assembly (not shown).

Inverter 3 comprises a number of gripping or retaining members 5, commonly known as collars, movable between a grip position (FIG. 2), in which gripping members 5 lie in a single plane A, and a release position (not shown) rotated substantially 180° about a hinge axis L.

Rough mold assembly 2a comprises a multicavity mold 4 having a longitudinal plane of symmetry P perpendicular to plane A, and in turn comprising two movable lateral half-molds 6. Half-molds 6 are located on opposite sides of plane P, surround gripping members 5, and define, with gripping members 5, a number of side by side cavities 8 having respective axes 9 of symmetry in plane P. Half-molds 6 are movable, with respect to gripping members 5, between a closed position (FIG. 1) defining cavities 8, and an open position enabling removal of the semifinished articles, by a mold opening/closing device 10 forming part of rough mold assembly 2a.

As shown in FIG. 2, device 10 comprises a hollow supporting and fastening structure 14 connected releasably to section frame 2 of machine 1 by screws, and extending upwards from section frame 2 and partly alongside mold 4.

With reference to FIG. 1, device 10 also comprises, for each half-mold 6, a respective known mold-holder insert or member 18, not described in detail, which has an intermediate portion hinged to a respective supporting and actuating arm 19 to rotate, with respect to arm 19, about a movable hinge axis 20 perpendicular to plane A. Each arm 19 is L-shaped, and has an end portion opposite that hinged to relative mold-holder insert 18 hinged to supporting structure 14 by a respective hinge pin 22 to rotate about a respective fixed hinge axis 23 parallel to movable axis 20. Pins 22 are located on opposite sides of plane P of symmetry, and at such a distance D from plane P of symmetry that, when half-molds 6 are in the closed position, the line 25 intersecting hinge axes 20 and 23 of each arm 19 extends substantially parallel to plane P of symmetry, as shown in FIG. 1.

With reference to FIG. 1, arms 19 are oscillated about respective fixed hinge axes 23 by a single linear actuator 28 housed inside supporting structure 14, extending over section frame 2, and so intersected by a continuation of plane A (FIG. 2).

In the example described, linear actuator 28 is a double-acting pneumatic actuator, and comprises a fixed outer cylinder 29 locked inside structure 14 and laterally defining a chamber 30, in which slides a piston 31 fitted through with an output rod 32, which moves back and forth in a direction 33 perpendicular to axes 20 and 23, and lying in plane P of symmetry, adjacent to and below plane A. Rod 32 has an end portion 34 projecting outwards of supporting structure 14, on the opposite side to mold 4, and fitted with an intermediate portion of a crosspiece 36, which is connected to an intermediate angle portion of each arm 19 by a respective lever transmission 37.

Each transmission 37 comprises two connecting rod-crank assemblies 38 and 39 located one outside and the other inside supporting structure 14. Connecting rod-crank assemblies 38 and 39 of each transmission are connected to each other by a respective intermediate shaft 40 extending parallel to axes 20 and 23; and each intermediate shaft 40 is located at a distance D1 from plane P of symmetry greater than distance D, and is connected to structure 14 to rotate about its axis of symmetry, which lies in a plane perpendicular to plane P of symmetry, and is located on the opposite side of axes 23 to the mold.

With reference to FIG. 1, each connecting rod-crank assembly 38 comprises a forked crank 42 fitted to a top end portion of respective intermediate shaft 40; and a connecting rod 43 hinged at one end to relative crank 42, and at the other end to L-shaped arm 19.

With reference to FIG. 3, each assembly 39 comprises a crank 44 fitted to the inner end portion of respective intermediate shaft 40; and a connecting rod 45 hinged at one end to relative crank 44, and at the other end to the end of a tie/pushrod 46 connected integrally to a corresponding end portion of crosspiece 36, as shown in FIG. 3.

Figure 6:
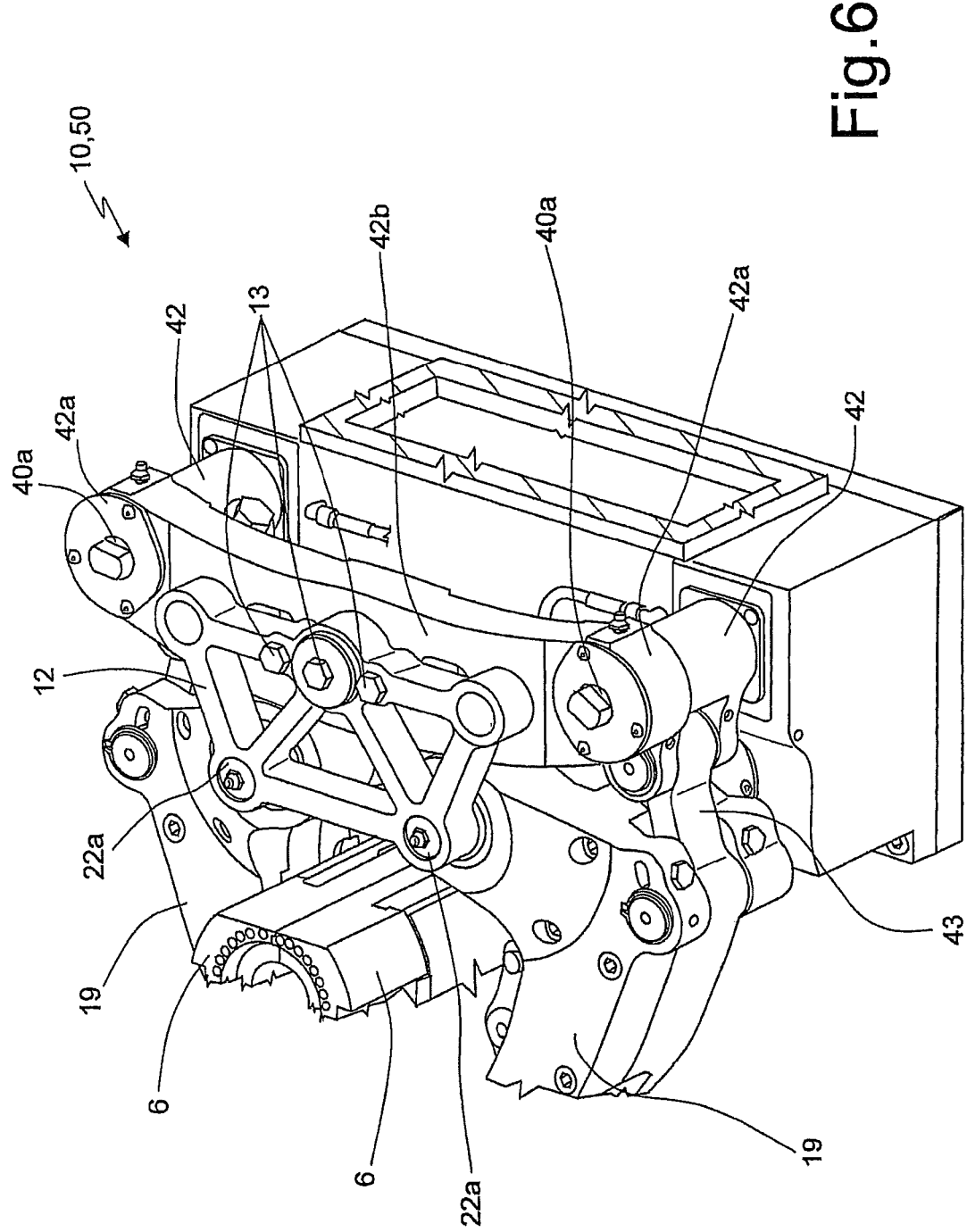
FIG. 6 shows a partial view in perspective of a portion of the mold opening/closing device in FIGS. 1 and 5.

With reference to FIG. 6, shafts 40 project upwards beyond respective forked cranks 42, and have respective end portions 40a connected in rotary and axially-fixed manner to respective end portions 42a of a crosspiece 42b; and hinge pins 22 have respective end portions 22a connected in rotary and axially-fixed manner to a stiffening frame 12, which extends horizontally over crosspiece 42b and perpendicularly to plane P, and is fitted integrally to crosspiece 42b by a number of screws 13.

Figure 5:
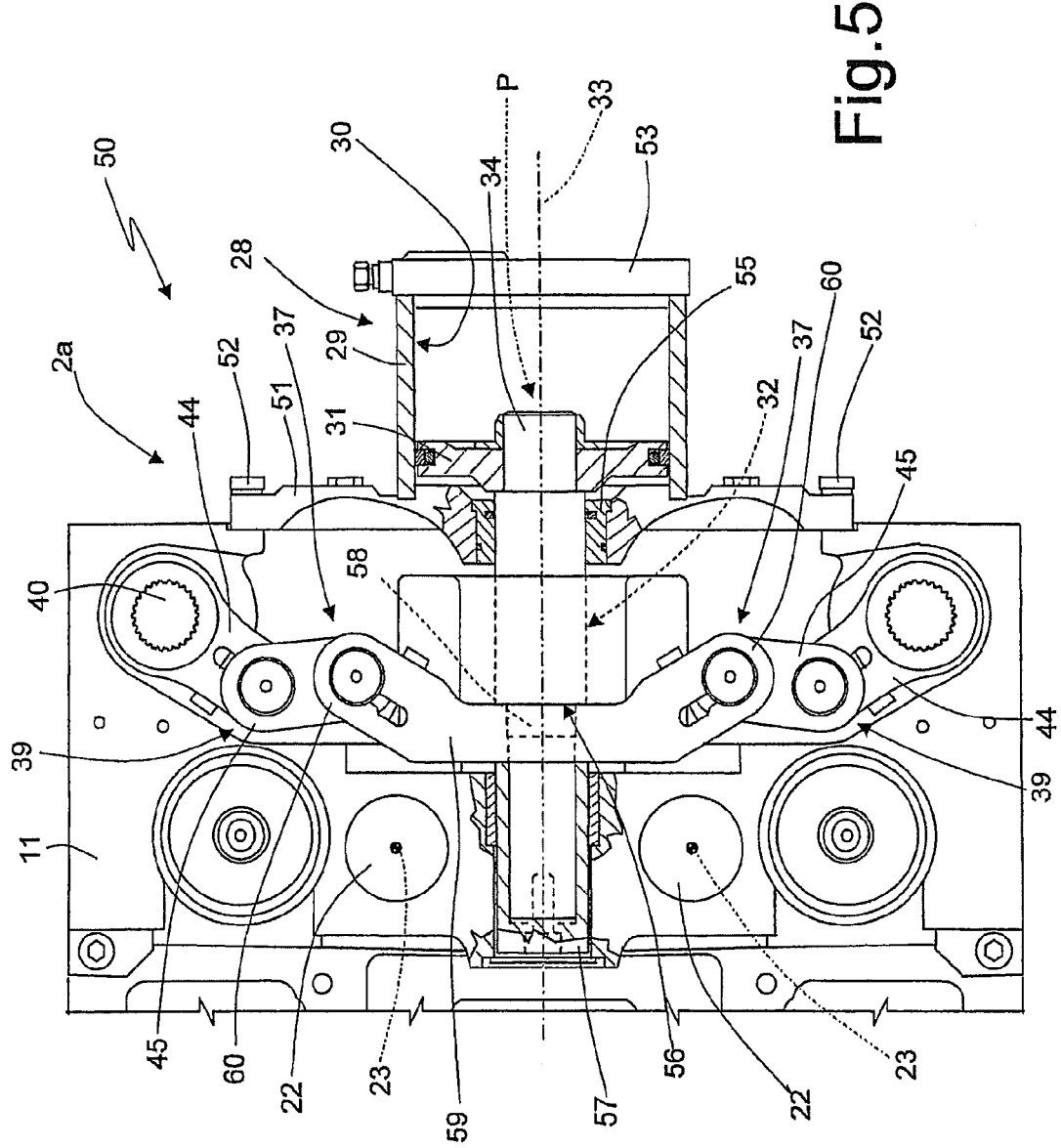
FIG. 5 is similar to FIG. 3, and shows a second preferred embodiment of the molds opening/closing device according to the present invention.

The FIG. 5 embodiment shows a mold opening/closing device 50, which differs from device 10 in a few construction details, and the component parts of which are indicated, where possible, using the same reference numbers as for the corresponding parts of device 10.

Linear actuator 28 of device 50 is located outside structure 14, and, more specifically, projects from structure 14 on the opposite side of structure 14 to inverter 3 and half-molds 6. That is, as shown in FIG. 5, device 50 comprises a fastening plate 51 fitted to structure 14 by a number of screws 52, and to which cylinder 29 is fitted, also by means of screws (not shown). Cylinder 29 is closed outwardly by a cover 53 to define, with cover 53 and part of plate 52, chamber 30 in which piston 31 slides. Unlike device 10, piston 31 of device 50 is fitted to end portion 34 of rod 32, which extends through fastening plate 51, is fitted to plate 51 in axially-sliding manner by a bush 55, and has an intermediate axial shoulder 56, to which a bush 57 locks a mid-portion 58 of a crosspiece 59, the opposite ends 60 of which are hinged to connecting rods 45. When crosspiece 59 is in a forward position shown in FIG. 5, cranks 44, connecting rods 45, and crosspiece 59 as a whole are set to a stable or braced condition, so the degree of closure of the mold no longer varies alongside a variation in the supply pressure of actuator 28, and precise control of actuator 28 is therefore no longer necessary.

With reference to FIGS. 4a and 4b, the angular position of each mold-holder insert 18 about respective movable hinge axis 20 and with respect to plane P of symmetry is determined, as half-molds 6 move between said closed position and said open position, by a single respective adjusting rod 65, which has one end hinged to structure 14 by a fixed hinge pin 66 parallel to axes 20 and 23, and the opposite end hinged to an appendix 67 of relative mold-holder insert 18, which extends perpendicularly to plane P and between relative fixed axis 23 and movable axis 20. Rods 65 are so designed that, as arms 19 rotate about respective fixed hinge axes 23, rods 65 exert torque on mold-holder inserts 18 to gradually rotate mold-holder inserts 18, and therefore half-molds 6, with respect to arms 19, so that half-molds 6 move strictly parallel to themselves at all times, i.e. in an unchanging angular position with respect to plane P of symmetry. As a result, cavities 8, regardless of their number and location in the mold, are all opened simultaneously, so the articles formed in the mold undergo the same forces/stress, thus resulting in perfectly homogeneous output.

Compared with known solutions, devices 10 and 50 described are highly efficient and reliable, by virtue of actuator 28 being located close to plane A of gripping members 5, i.e. close to supporting and actuating arms 19. As a result, the length of intermediate shafts 40 is drastically reduced, thus greatly improving response, and enabling an increase in mold open/close frequency with no noticeable delay in response.

As will be clear from the above description, providing a structure 14 for attaching and supporting arms 19, respective inserts 18, actuator 28, and transmissions 37 interposed between actuator 28 and arms 19, means the device is located entirely on top of section frame 2 and therefore quick and easy to replace. That is, by simply removing the screws connecting supporting structure 14 to the machine 1, devices 10, 50 can be removed completely in one single operation, thus drastically reducing downtime.

By locating actuator 28 adjacent and parallel to plane A and along axis 33 of symmetry, thus reducing the length of intermediate shafts 40 as compared with known solutions, and by locating transmissions 37 rearwards of the fixed hinge axes, the resulting device is highly compact, and, unlike known solutions, leaves a considerable amount of freely usable space inside machine 1 and particularly alongside arms 19.

Moreover, the geometry of the linkages adopted provides for translatory movement of the half-molds, parallel to each other at all times, using straightforward vertical-axis hinges, which can be formed cheaply, easily, and even to a high degree of precision, with no recourse to other types of control systems, such as guide-slide assemblies, which are far more complex and expensive to produce and maintain.

Housing actuator 28 completely inside structure 14, as in device 10, provides for a particularly compact device.

On the other hand, locating actuator 28 outside structure 14, and crosspiece 59 inside structure 14, i.e. close to fixed axes 23, as in device 50, provides for obtaining extremely rigid transmissions 37 and, hence, extremely precise movement of the arms. That is, crosspiece 59, being substantially aligned with transmissions 37, is subjected to opposing compression forces that cancel each other out without producing any bending torque on crosspiece 59.

Actuator 28 being located outside structure 14 also makes for easy maintenance and fast replacement of the actuator, thus reducing downtime.

Clearly, changes may be made to devices 10 and 50 as described herein without, however, departing from the scope as defined in the accompanying Claims.

In particular, the geometry and location of both fastening and supporting structure 14 and arms 19 may obviously differ from those described by way of example; pneumatic actuator 28 described may be replaced by other types of actuators, e.g. electric; and mechanical transmissions 37 may be formed differently from those described.

What invention claimed is:

1. A device for opening/closing a mold of a glassware forming machine, the mold having a longitudinal plane of symmetry, and comprising two movable half-molds, the device comprising:
   a supporting structure;
   for each of two said half-molds, a respective mold-holder, and a respective supporting and actuating arm hinged to the respective mold-holder to rotate about a respective movable hinge axis, and to a supporting structure to rotate about a respective fixed hinge axis; and
   actuating means for rotating the supporting and actuating arms in opposite directions with respect to said supporting structure, and for moving the half-molds between a closed position and an open position;
   wherein said fixed hinge axes are located on opposite sides of said plane of symmetry, and at such a distance from the plane of symmetry that, when the half-molds are in the closed position, a line intersecting said respective fixed axis and said respective movable hinge axis of each respective supporting and actuating arm extends substantially parallel to said plane of symmetry;
   wherein each of two said half-molds surround a corresponding movable gripping member for retaining semi-finished articles formed in said respective mold, said corresponding movable gripping members being maintained connected to said respective half-molds and in a plane substantially perpendicular to said plane of symmetry;
   wherein said corresponding movable gripping members are in a plane substantially perpendicular to said respective fixed and movable hinge axes, and wherein said actuating means comprise at least a linear actuator intersected by said plane;
   wherein said linear actuator comprises an output rod movable back and forth in a direction perpendicular to said fixed and movable axes and parallel to said plane of symmetry;
   wherein said supporting structure supports all actuating means, all mold-holders, and all supporting and actuating arms, and is connected releasably to a section frame of the machine.

2. The device as claimed in claim 1, wherein said releasable connection is a mechanical linkage that controllably engages said section frame, the mechanical linkage comprising at least one of pins, worm drives, splines, fasteners, interference fitted joints, and clamps.

3. The device as claimed in claim 2, wherein said mechanical linkage is a screw-nut assembly.

4. The device as claimed in claim 2, wherein said mechanical linkage controllably engages said section frame by one or more of hydraulics, pneumatics, springs, gears, cables, pulleys, and electricity.

5. The device as claimed in claim 1, wherein said releasable connection is comprised of one or more electromechanical devices that controllably engage said section frame.

6. The device as claimed in claim 1, wherein said output rod slides in a direction lying in said plane defined by the movable gripping members.

7. The device as claimed in claim 1, wherein said output rod slides in a direction extending adjacent to and beneath said plane defined by the movable gripping members.

8. The device as claimed in claim 1, wherein said linear actuator is housed completely in said supporting structure.

9. The device as claimed in claim 1, wherein said linear actuator projects from said supporting structure in a cantilever position.

10. The device as claimed in claim 1, wherein said linear actuator is connected to said supporting structure in a releasable manner.

11. A device for opening/closing a mold of a glassware forming machine, the mold having a longitudinal plane of symmetry, and comprising two movable half-molds, the device comprising:
    a supporting structure;
    for each of two said half-molds, a respective mold-holder, and a respective supporting and actuating arm hinged to the respective mold-holder to rotate about a respective movable hinge axis, and to a supporting structure to rotate about a respective fixed hinge axis; and
    actuating means for rotating the supporting and actuating arms in opposite directions with respect to said supporting structure, and for moving the half-molds between a closed position and an open position;

wherein said fixed hinge axes are located on opposite sides of said plane of symmetry, and at such a distance from the plane of symmetry that, when the half-molds are in the closed position, a line intersecting said respective fixed axis and said respective movable hinge axis of each respective supporting and actuating arm extends substantially parallel to said plane of symmetry;

wherein each of two said half-molds surround a corresponding movable gripping member for retaining semi-finished articles formed in said respective mold, said corresponding movable gripping members being maintained connected to said respective half-molds and in a plane substantially perpendicular to said plane of symmetry;

wherein said corresponding movable gripping members are in a plane substantially perpendicular to said respective fixed and movable hinge axes, and wherein said actuating means comprise at least a linear actuator intersected by said plane;

wherein said linear actuator comprises an output rod movable back and forth in a direction perpendicular to said fixed and movable axes and parallel to said plane of symmetry, wherein said output rod slides in a direction extending adjacent to and beneath said plane defined by the movable gripping members;

wherein said supporting structure supports all actuating means, all mold-holders, and all supporting and actuating arms, and is connected releasably to a section frame of the machine.

12. The device as claimed in claim 1, wherein a plurality of degrees of reduction are provided between said linear actuator and said supporting and actuating arms.

13. The device as claimed in claim 11, wherein a plurality of degrees of reduction are provided between said linear actuator and said supporting and actuating arms.

14. The device as claimed in claim 1, wherein said releasable connection is releasable by other than a destructive means.

15. The device as claimed in claim 14, wherein said supporting structure is connected releasably as a single piece to said section frame.

16. The device as claimed in claim 14, wherein said supporting structure is releasable in a single operation from said section frame.

17. The device as claimed in claim 11, wherein said releasable connection is releasable by other than a destructive means.

18. The device as claimed in claim 17, wherein said supporting structure is connected releasably as a single piece to said section frame.

19. The device as claimed in claim 17, wherein said supporting structure is releasable in a single operation from said section frame.

* * * * *

UNITED STATES PATENT AND TRADEMARK OFFICE
CERTIFICATE OF CORRECTION

PATENT NO. : 8,316,669 B2
APPLICATION NO. : 13/225106
DATED : November 27, 2012
INVENTOR(S) : Lorenzo Armando et al.

It is certified that error appears in the above-identified patent and that said Letters Patent is hereby corrected as shown below:

Title Page, Under the Foreign Application Priority Data section (30), please delete the application no. "2007A0090" and replace it with --TO 2007 A000090-- therein.

Signed and Sealed this
Fifth Day of March, 2013

Teresa Stanek Rea
*Acting Director of the United States Patent and Trademark Office*